United States Patent
Roy-Auberger et al.

(10) Patent No.: US 6,977,273 B2
(45) Date of Patent: Dec. 20, 2005

(54) PROCESS FOR SYNTHESISING HYDROCARBONS IN THE PRESENCE OF A CATALYST COMPRISING A GROUP VIII METAL SUPPORTED ON SILICA-ALUMINA

(75) Inventors: Magalie Roy-Auberger, Bourgoin Jallieu (FR); Philippe Courty, Villejuif (FR); Renaud Revel, Houilles (FR); Roberto Zennaro, Venezia (IT)

(73) Assignees: Institut Francais du Petrole, Rueil Malmaison Cedex (FR); ENI S.p.A., Rome (IT); AGIP Petroli S.p.A., Rome (IT)

( * ) Notice: Subject to any disclaimer, the term of this patent is extended or adjusted under 35 U.S.C. 154(b) by 570 days.

(21) Appl. No.: 10/075,235

(22) Filed: Feb. 15, 2002

(65) Prior Publication Data

US 2002/0132865 A1 Sep. 19, 2002

(30) Foreign Application Priority Data

Feb. 16, 2001 (FR) .................................. 01 02241

(51) Int. Cl.⁷ ......................... C07C 27/00; B01J 21/08; B01J 23/00; B01J 21/04
(52) U.S. Cl. ...................... 518/715; 518/721; 502/263; 502/303; 502/439
(58) Field of Search ................. 518/715, 700, 518/721; 502/263, 303, 439

(56) References Cited

U.S. PATENT DOCUMENTS 4,497,903 A 2/1985 Kibby et al.
6,465,530 B2 * 10/2002 Roy-Auberger et al. .... 518/715

FOREIGN PATENT DOCUMENTS

FR    2 804 689    8/2001
WO    WO99/42214    8/1999

* cited by examiner

*Primary Examiner*—J. Parsa
(74) *Attorney, Agent, or Firm*—Millen, White, Zelano & Branigan, P.C.

(57) ABSTRACT

A process is described for synthesizing hydrocarbons from a mixture comprising carbon monoxide and hydrogen in the presence of a catalyst comprising at least one group VIII metal supported on a silica-alumina prepared by co-precipitating and calcining at a temperature in the range from about 500° C. to about 1200° C. for at least 6 hours so that said silica-alumina has a specific surface area of less than 260 m²/g. Said catalyst is used in a fixed bed or in suspension in a liquid phase of a three-phase reactor.

19 Claims, No Drawings

PROCESS FOR SYNTHESISING HYDROCARBONS IN THE PRESENCE OF A CATALYST COMPRISING A GROUP VIII METAL SUPPORTED ON SILICA-ALUMINA

This application claims benfit of Ser. No. 60/186,300 file Mar. 1, 2000.

The present invention relates to a process for synthesising hydrocarbons from a mixture comprising CO—($CO_2$)—$H_2$ (i.e., a mixture comprising carbon monoxide and hydrogen and possibly carbon dioxide, known as synthesis gas). This process comprises using a catalyst comprising at least one group VIII metal, preferably cobalt, supported on a silica-alumina, prepared by co-precipitating and calcining at a temperature in the range from about 500° C. to about 1200° C. for at least 6 hours, so as to have a specific surface area of less than 260 $m^2/g$.

PRIOR ART

The skilled person is aware that synthesis gas can be converted to hydrocarbons in the presence of a catalyst containing transition metals. Such conversion, carried out at high pressures and under pressure, is known in the literature as the Fischer-Tropsch synthesis. Metals from group VIII of the periodic table such as iron, ruthenium, cobalt and nickel catalyse the transformation of CO—($CO_2$)—$H_2$ mixtures (i.e., a mixture of carbon monoxide, hydrogen and possibly carbon dioxide, known as synthesis gas) to liquid and/or gaseous hydrocarbons.

Different methods have been described and developed in the prior art that are intended to improve the preparation of Fischer-Tropsch catalysts based on cobalt supported on different supports. The most widely used supports are alumina, silica and titanium dioxide, occasionally modified by additional elements.

International patent WO-A-99/39825 describes the use of a support comprising a titanium dioxide base on which a binder constituted by silica and alumina has been incorporated. The mechanical properties of the catalyst obtained are improved, in particular for use in a three-phase reactor, generally known as a slurry reactor. Usually, such a reactor is of the slurry bubble column type.

WO-A-99/42214 describes adding a stabilising element to a catalyst support that is partially soluble in an aqueous acidic or neutral medium, selected from alumina, titanium oxide and magnesia, used to prepare a catalyst active in the Fischer-Tropsch synthesis. The preferred support is alumina. The stabiliser can be selected from the group formed by: Si, Zr, Cu, Zn, Mn, Ba, Co, Ni and/or La. It can substantially reduce the solubility of the support in acid or neutral aqueous solutions. The preferred stabiliser is silica, added in the form of an organic silicon compound by deposition onto the pre-formed alumina support; at least 0.06, and at most 2.8 atoms of silicon per square metre of support is added.

Cobalt-based Fischer-Tropsch catalysts described in the invention cited above and used in a three-phase reactor can lead to excessive losses of catalyst in the paraffin waxes produced, by the formation of submicronic fines. The catalyst losses, expressed with respect to the cobalt, can reach 50 mg of cobalt per kilogram of wax.

U.S. Pat. Nos. 5,169,821 and 5,397,806 describe including silicon, zirconium or tantalum in a cobalt-based catalyst supported on $TiO_2$ in the form of anatase to stabilise it to high temperature regeneration.

WO-A-96/19289 describes the use of a catalyst to convert synthesis gas to hydrocarbons based on cobalt, ruthenium or iron supported on a mesoporous crystalline aluminosilicate with a particular pore structure.

U.S. Pat. No. 4,497,903 describes incorporating cobalt into the crystalline layers of an aluminosilicate. The catalyst obtained is active on converting synthesis gas into liquid hydrocarbons principally constituted by branched hydrocarbons with a high octane number.

The above patents concern the stabilisation of supports used to produce catalysts for converting synthesis gas into hydrocarbons. Other prior art patents must also be cited.

U.S. Pat. No. 4,013,590 describes the stabilisation of oxide supports, in particular alumina, by adding organic silicon compounds, drying and thermal decomposition. The quantities of silicon added with respect to the alumina correspond to 1 to 6 silicon atoms per square meter. The supports obtained have improved mechanical properties and are used in automobile post combustion.

European patent application EP-A-0 0 184 506 describes the manufacture of catalyst supports constituted by alumina agglomerates stabilised by adding silica in an aqueous solution, drying and thermal decomposition, with improved mechanical properties, in particular as regards the formation of fine particles by attrition. Such supports are used in hydrotreatment, hydrocracking, hydrogenation and dehydrogenation of hydrocarbons or other organic compounds.

U.S. Pat. No. 5,045,519 describes a process for preparing silica-alumina leading to a high purity product that is thermally stable. It is prepared by hydrolysis of an aluminium alkoxide and simultaneous or successive addition of orthosilicic acid previously purified by ion exchange. The silica-aluminas obtained are used as a support for a desulphurisation catalyst, in $DeNO_x$ catalysis, for oxidation, in hydrocracking, in mild hydrocracking, in automobile exhaust catalysis, and in isomerisation.

The present invention concerns a process for synthesising hydrocarbons from a mixture comprising carbon monoxide and hydrogen, and possibly carbon monoxide, in the presence of a catalyst comprising at least one group VIII metal, preferably cobalt, supported on a particular silica-alumina which will be described below. The catalyst is preferably used in suspension in a liquid phase in a perfectly stirred autoclave type three-phase reactor or slurry bubble column. It is also suitable for use in a fixed bed.

The Applicant has discovered that using a silica-alumina support prepared by co-precipitating at least one soluble aluminium compound and at least one silicon compound, washing, drying and calcining at a high temperature for a time sufficient to encourage interactions between the alumina and the silica (Al—O—Si bonds), after impregnation with at least one group VIII metal, preferably cobalt, can produce a catalyst that is particularly active in a process for synthesising hydrocarbons from a mixture comprising carbon monoxide and hydrogen. Further, said catalyst has improved mechanical properties, in particular when, as is preferable, it is used in suspension in a liquid phase in a three-phase reactor, and it has better resistance to attrition phenomena.

The term "co-precipitation" as used by the Applicant means a process in which at least one aluminium compound that is soluble in a neutral or acidic medium as will be described below, and at least one silicon compound as will be described below, are brought into contact, simultaneously or sequentially, in the presence of at least one precipitating and/or co-precipitating compound so as to obtain a mixed phase essentially constituted by hydrated alumina-silica which is optionally homogenised by intense agitation, shearing, colloidal milling or by a combination of these individual operations.

As will be described below, the Applicant distinguishes the processes of true co-precipitation from solutions or by reaction of a true solution and a submicronic colloidal suspension, for example of silicic acid, in the presence of at least one mineral precipitation agent, from sequential co-precipitation processes in which a first aluminium compound that is soluble in an acidic medium is precipitated in the form of a hydroxide, oxohydroxide or a hydroxycarbonate from a water-soluble salt or from an aluminium alkoxide or alcoholate then is mixed with a second silicon compound and, simultaneously or consecutively, is added to at least one precipitating agent such as will be described below. The silicon compound is itself selected from the group formed by silicic acid, Ludox in its ammoniacal form, and quaternary ammonium silicates described in the aforementioned European patent application, used pure or as a mixture. The two above implementations constitute the most well-known co-precipitation procedures.

A third procedure consists of preparing, by precipitation, at least one compound of aluminium, hydroxide, oxohydroxide or hydroxycarbonate then mixing it with at least one silicon compound such as a silicic acid in aqueous solution or in the form of a submicronic colloidal suspension or a hydrosol. The mixture obtained is then homogenised to a micronic scale and preferably a nanometric scale by intense agitation, shearing, colloidal milling or a combination of these individual operations, which are known to the skilled person. This implementation is assimilated into sequential co-precipitation.

The silica-alumina used in the process of the present invention is preferably a silica-alumina that is homogeneous on the micrometric scale and in which the quantity of anionic impurities (for example $SO_4^{2-}$, $Cl^-$) and cationic impurities (for example $Na^+$) is preferably less than 0.1% by weight, more preferably less than 0.05% by weight.

The silica-alumina used in the process of the invention is prepared by co-precipitation, as stated above.

By way of example, the silica-alumina support used in the process of the invention can be prepared by true co-precipitation under controlled stationary operating conditions (average pH, concentration, temperature, mean residence time) by reacting a basic silicon-containing solution, for example in the form of sodium silicate, optionally aluminium, for example in the forn of sodium aluminate, with an acidic solution containing at least one aluminium salt, for example aluminium sulphate. At least one carbonate, or $CO_2$ can optionally be added to the reaction medium.

After co-precipitation, the support is obtained by filtering and washing, optionally washing with an ammoniacal solution to extract the residual sodium by ion exchange, drying and forming, for example by spray drying then calcining, preferably in air in a rotary oven and at a high temperature, generally in the range about 500° C. to about 1200° C., for a time sufficient to encourage the formation of interactions between the alumina and the silica, generally at least 6 hours. These interactions lead to a better mechanical strength of the support and thus of the catalyst used in the process of the invention.

A further method for preparing the silica-alumina of the invention consists of preparing, from a water-soluble alkaline silicate, a solution of silicic acid, hereinafter termed orthosilicic acid ($H_2SiO_4$, $H_2O$) decationised by ion exchange then simultaneously added to a cationic aluminium salt in solution, for example the nitrate, and ammonia under controlled operating conditions; or adding the orthosilicic acid solution to the cationic aluminium salt in solution and co-precipitating the solution obtained with ammonia under controlled operating conditions, resulting in a homogeneous product. $CO_2$ can optionally be added to the reaction medium. After filtering and washing, drying with forming and calcining between about 500° C. and about 1200° C. for at least 6 hours, a silica-alumina support that can be used in the process of the invention is obtained.

A further method for preparing the silica-alumina of the invention consists of precipitating the hydrated alumina as described above, washing it then mixing it with aqueous orthosilicic acid to obtain a suspension, which is then intimately homogenised by intense agitation and shearing. An Ultraturrax turbine or a Staro turbine can be used, or a colloidal mill, for example an IKA colloidal mill. The homogeneous suspension is then spray dried as described above, and calcined between about 500° C. and about 1200° C. for at least 6 hours. A silica-alumina that can be used in the process of the invention is then obtained.

A preferred method, disclosed in U.S. Pat. No. 5,045,519, consists of preparing a decationised orthosilicic acid as above then simultaneously adding it to at least one C2 to C20 alkoxide, or to an aluminium trihexanoate, and to demineralised water to cause hydrolysis; or the decationised orthosilicic acid solution can be added to the hydrolysis product of an aluminium alkoxide such as aluminium trihexanoate. After intense homogenisation of the suspension by vigorous stirring or colloidal milling as described above, optional adjustment of the dry matter content by filtering then re-homogenisation, the product is dried and formed, then calcined between about 500° C. and about 1200° C. for at least 6 hours.

In all of the preparation methods described, during any step of the preparation it may be desirable to add a small proportion of a stabilising element selected from the group formed by lanthanum, praseodymium and neodymium. The stabilising element is preferably added in the form of a soluble salt, for example a nitrate.

Preferably, a soluble salt of at least one stabilising element is added to the aqueous cationic aluminium salt or, as disclosed in U.S. Pat. No. 5,045,519, simultaneously or consecutively with bringing the aluminium compound into contact with the orthosilicic acid in an aqueous medium, the orthosilicic acid itself being added simultaneously or consecutively with hydrolysis of at least one aluminium alkoxide.

The alumina precursors used in the present invention are thus distinguished from those cited in the prior art by the following characteristics:

They are entirely soluble in an aqueous medium: cationic aluminium salts, for example the nitrate, or in an organic medium, for example: aluminium hexanoate in a hexanol medium.

They are soluble in an acid medium, and are constituted by at least one alumina hydrogel and/or alcogel such as aluminium hydroxides or oxohydroxides for example hydrated aluminas, such as the microcrystalline or amorphous trihydroxide, pseudoboehmite, boehmite, bayerite, hydrargillite, diaspore; or by at least one aluminium hydroxycarbonate. The term "soluble in an acid medium" as used by the Applicant means that bringing them into contact before adding any silicon, immediately after co-precipitation and washing, with an acid solution, for example sulphuric acid or nitric acid, causes complete dissolution or, if they are essentially crystalline, the formation of a submicronic hydrosol of boehmite in which most of the alumina is clearly dissolved. This dissolving property is a required property of the invention, and is applicable to alumina hydrogels or alcogels before adding silicon.

They are only formed after being brought into contact with at least one silica compound and optional other metals as will be described below.

They are distinguished from activated aluminas such as gamma, delta, theta, eta, pure alpha aluminas or mixtures thereof, which are at most partially soluble in a neutral aqueous medium or preferably an acidic medium as disclosed in the prior art cited above and which are formed prior to addition of silicon when they are then supplemented with cobalt and used for synthesising hydrocarbons from synthesis gas. Further, in this case, which does not form part of the present invention, the required property is minimal dissolution of the support.

The silica-alumina supports used in the present invention preferably contain between 0.5% and 30% by weight of silica, more preferably between 1% and 20% by weight, still more preferably between 1.4% and 15% by weight of silica with respect to the anhydrous product.

They can also contain 0.1% to 5% by weight, preferably 0.5% to 2% by weight, of at least one oxide $M_2O_3$ of at least one metal M selected from the group formed by lanthanum, praseodymium and neodymium.

The support is preferably formed into a fine calibrated powder with a grain size of 800 microns ($\mu$m) or less, preferably in the range 10 to 500 $\mu$m, more preferably in the range 10 to 300 $\mu$m, still more preferably in the range 20 to 150 $\mu$m, for optimum use in the presence of a liquid phase. The single drying-plus-forming step is preferably carried out by spray drying, to obtain substantially spherical microbeads with a size of less than about 800 $\mu$m.

After drying, the product is calcined, for example in air and in a rotary oven at a temperature in the range about 500° C. to about 1200° C., preferably in the range 550° C. to 1200° C., more preferably in the range 700° C. to 1200° C., highly preferably in the range 800° C. to 1100° C., and for a time sufficient to bring the specific surface area to less than 260 $m^2$/g, preferably less than 220 $m^2$/g, more preferably to a specific surface area in the range 130 to 200 $m^2$/g, and highly preferably in the range 130 to 190 $m^2$/g. Said calcining step generally lasts at least 6 hours, preferably at least 10 hours, more preferably at least 15 hours. As an example, said silica-alumina can be calcined for 12 hours at 1050° C.

It is also possible to commence calcining at low temperature, i.e., at a temperature in the range 350° C. to 550° C. for at least 1 hour, preferably at least 3 hours, then to raise the temperature to a temperature in the range about 500° C. to about 1200° C.

In a further implementation, the support is calcined firstly at 550° C. for three hours then treated in an air/$H_2O$ mixture at 800° C. for 24 hours, to obtain the required specific surface area.

In a further variation, the support is in the form of spheres or extrudates with an equivalent diameter in the range 2 to 10 mm, for use in a fixed bed.

The catalyst supports for use in the process of the present invention have micronic homogeneity (i.e., on the micron scale), determined by microanalysis using a Castaing microprobe, such that the Si/Al atomic ratio, measured locally in several sections of the support particles, does not fluctuate by more that 20% around the mean value.

Preferably, the supports resulting in the catalysts used in the process of the invention have a "nanometric" homogeneity, i.e., on the nanometre scale.

One method that can be used to characterize the supports, and in particular to determine their homogeneity, is the transmission electron microscope (TEM). To this end, an electron microscope is used (JEOL 2010 or Philips Tecnai20F, with optional scanning) provided with an energy dispersion spectrometer (EDS) for X ray analysis (for example a Tracor or an Edax). The EDS detector must allow light element detection. The combination of these two tools, TEM and EDS, combines imagery and local chemical analysis with good spatial resolution.

For this type of analysis, the samples are finely dry ground in a mortar; the powder is then incorporated into a resin to produce ultrafine sections about 70 nanometres (nm) thick. These sections are collected on copper screens coated with an amorphous perforated carbon film, and acting as a support. They are then introduced into the microscope for observation and analysis under high vacuum. The image allows the sample zones to be readily distinguished from the resin zones. A certain number of analyses, a minimum of 10, preferably in the range 15 to 30, are then carried out on different zones of the incorporated sample. The diameter of the electron beam for analysing the zones (approximately determining the size of the analysed zones) is a maximum of 50 mm, preferably 20 nm, more preferably 10, 5, 2 or 1 nm in diameter. In scanning mode, the analysed zone will be a function of the size of the scanned zone and not the size of the beam, which is generally reduced.

Semi-quantitative treatment of the X ray spectra recovered using the EDS spectrometer can provide the relative concentration of Al and Si (in atomic %) and the ratio Si/Al for each of the zones analysed. The mean ratio, Si/Al$_m$, can be calculated, along with the standard deviation $\sigma$ of this set of measurements.

The process of the present invention uses catalysts wherein the relative standard deviation $\sigma$ (with respect to the value Si/Al$_m$) is less than 30%, preferably 20%, for an overall Si/Al ratio that is preferably in the range 0.1 to 10. This overall ratio can be measured by other techniques that are routinely used for this type of analysis (X ray fluorescence, for example).

The catalyst used in the process of the invention is constituted by at least one element from group VIII (element selected from elements from groups 8, 9 and 10 in the new periodic table) supported on a silica-alumina with the characteristics described above, and prepared by co-precipitation.

The element from group VIII of the periodic table is preferably selected from iron, cobalt and ruthenium. More preferably, the group VIII metal is cobalt.

One technique for preparing the catalyst which is particularly suitable for carrying out the process of the invention is impregnation of an aqueous solution of a precursor of the metal from group VIII of the periodic table, preferably cobalt, for example an aqueous solution of salts such as cobalt nitrates. The weight content of the group VIII metal with respect to the total catalyst weight is generally in the range 0.1% to 50%, preferably in the range 1% to 30%.

The catalyst an also contain at least one additional element, for example an activity promoter, for example at least one element selected from the group formed by ruthenium, molybdenum and tantalum, or reducibility promoters such as platinum, palladium or ruthenium. The amount by weight of additional element with respect to the total catalyst weight is generally in the range 0.01% to 5%. These additional elements are preferably introduced at the same time as the group VIII metal or, in a preferred variation, in at least one subsequent step.

In a particular implementation of the invention, the catalyst contains both cobalt and ruthenium. In a further particular implementation of the invention, the catalyst contains cobalt and tantalum.

The mechanical strength of the catalyst of the invention is improved with respect to a catalyst comprising a support constituted solely by alumina or silica, or titanium dioxide.

The mechanical strength of the catalyst of the invention can be determined by measuring the change in the particle size at the end of a set test period during use of a three-phase reactor.

The catalysts so prepared result in particularly stable performances in Fischer-Tropsch synthesis and to a conversion of synthesis gas into a mixture of linear and saturated hydrocarbons containing at least 50% by weight of C5+ hydrocarbons and less than 20% of methane with respect to the total hydrocarbons formed.

The following conditions are normally employed for said catalysts when synthesising hydrocarbons:

The catalyst comprising at least one group VIII metal impregnated on the silica-alumina support described above is dried then calcined. The catalyst is then pre-reduced using at least one reducing compound, for example selected from the group formed by hydrogen, carbon monoxide and formic acid, optionally mixed with an inert gas, for example nitrogen, in a reducing compound/(reducing compound+inert gas) mole ratio in the range 0.001:1 to 1:1.

Reduction can be carried out in the gas phase at a temperature in the range 100° C. to 600° C., preferably in the range 150° C. to 400° C., at a pressure in the range 0.1 to 10 MPa and at an hourly space velocity in the range 100 to 40000 volumes of mixture per volume of catalyst per hour.

This reduction can also be carried out in the liquid phase, under the same operating conditions as in the gas phase, the catalyst then being suspended in an inert liquid phase (also known as the solvent), for example a paraffin cut comprising at least one hydrocarbon containing at least 5, preferably at least 10 carbon atoms per molecule.

When the catalyst is used in a three-phase reactor, it may be advantageous to use, as is preferable, the same inert solvent as that used during the reaction. Highly preferably, a paraffin cut from the Fischer-Tropsch process is used, for example a kerosene or gas oil cut. Preferably, this reduction is carried out in situ, i.e., in the reactor that is then used to carry out the Fischer-Tropsch synthesis.

The catalyst used in the process of the invention can also be reduced ex situ or offsite, i.e., not in the Fischer-Tropsch synthesis reactor, or even outside the industrial site carrying out the process. Reduction can then optionally be carried out by an enterprise accustomed to carrying out offsite treatments.

In such a case, the catalyst is reduced under the operating conditions described above. After reducing and cooling the reduced catalyst to at least 100° C., said catalyst is preferably mixed, in an amount of 10% to 80% by weight, with solid paraffin waxes at ambient temperature and pre-heated to liquefy the waxes. Preferably, paraffin waxes from a Fischer-Tropsch process are used. After mixing, the suspension obtained is drop coagulated by projecting onto a support belt followed by cooling. The product obtained is in the form of grains with an equivalent diameter (diameter of the sphere with a equivalent volume) in the range about 5 to about 20 mm in diameter. These catalyst grains can be charged directly into the Fischer-Tropsch reactor.

The conversion of synthesis gas to hydrocarbons is then carried out under a total pressure that is normally in the range 0.1 to 15 MPa, preferably in the range 1 to 10 MPa; the temperature is generally in the range 150° C. to 350° C., preferably in the range 170° C. to 300° C. The hourly space velocity is normally in the range 100 to 20000 volumes of synthesis gas per volume of catalyst per hour ($h^{-1}$), preferably in the range 200 to 10000 $h^{-1}$, more preferably in the range 400 to 5000 $h^{-1}$, and the $H_2/CO$ ratio in the synthesis gas is normally in the range 1:2 to 5:1, preferably in the range 1.2:1 to 2.5:1.

The catalyst may be used in the form of a fine calibrated powder with a grain size of less than 800 microns ($\mu$m), preferably in the range 10 to 500 $\mu$m, more preferably in the range 10 to 300 $\mu$m, highly preferably in the range 20 to 150 $\mu$m, and still more preferably in the range 20 to 120 $\mu$m, when it is used in suspension in a liquid phase. It can also be used in the form of particles with an equivalent diameter in the range about 2 to 10 mm, preferably in the range 3 to 8 mm, when used in a fixed bed.

The process of the present invention can be used with said catalyst disposed in a fixed bed. In such a process, the reaction takes place in the gas phase. The mechanical strength of the catalyst described above is sufficiently high for it to be manipulated and charged into such a reactor without risk of disintegration. The process of the invention can also, as is preferable, be carried out in a three-phase reactor in which the catalyst is in suspension in an inert liquid phase (solvent). As an example, a perfectly stirred reactor such as an autoclave or a bubble column type three-phase reactor (also known as a slurry bubble column) can be used.

The catalyst is advantageously used in a three-phase reactor, preferably a slurry bubble column, as this type of operation enables:

optimum use of the performances of the catalyst (activity and selectivity), by limiting intra-granular diffusion phenomena;

substantial limitation of thermal effects in the catalyst grain, which is surrounded by a liquid phase.

This type of implementation requires that the catalyst and reaction products be separated.

Under these conditions, the catalyst used in the process of the invention has improved mechanical properties, which leads to optimum separation of the catalyst and products, and an improved service life. Said catalyst has an improved attrition resistance, and thus a substantial reduction in the amount of fines formed during use with a three-phase reactor. One possible explanation for this improvement is the presence of more substantial and a greater number of interactions between the alumina and the silica in the silica-alumina prepared by co-precipitation.

In summary, the invention concerns a process for synthesising hydrocarbons from a mixture comprising carbon monoxide and hydrogen in the presence of a catalyst comprising at least one group VIII metal supported on a silica-alumina prepared by co-precipitating and calcining at a temperature in the range from about 500° C. to about 1200° C. for at least 6 hours such that said silica-alumina has a specific surface area of less than 260 $m^2/g$.

In a preferred implementation, the silica-alumina is calcined at a temperature in the range 700° C. to 1200° C. for at least 10 hours. In a further preferred implementation, the silica-alumina is initially calcined at a temperature in the range about 350° C. to about 550° C. for at least 1 hour, then at a temperature in the range about 500° C. to about 1200° C. for at least 6 hours.

Preferably, the silica-alumina is homogeneous on the micrometer scale, and more preferably, the amount of anionic and cationic impurities is less than 0.1% by weight.

Preferably, the silica-alumina contains 0.5% to 30% by weight of silica with respect to the anhydrous product, and the group VIII metal content is in the range 0.1% to 50% by weight. The group VIII metal is preferably cobalt.

The catalyst for the process of the invention can optionally also contain at least one additional element selected from the group formed by: ruthenium, molybdenum, tantalum, platinum and palladium. It can also contain 0.1% to 5% by weight of at least one oxide $M_2O_3$ of at least one metal M selected from the group formed by lanthanum, praseodymium and neodymium.

Preferably, the catalyst is used in suspension in a liquid phase, in a three-phase reactor, generally in the form of a powder with a grain size of less than 800 microns. Said catalyst can, however, be used in a fixed bed in the form of particles with an equivalent diameter in the range 2 to 10 mm.

The following examples illustrate the invention.

EXAMPLE 1 (IN ACCORDANCE WITH THE INVENTION)

Catalyst A

Catalyst A, $Co/SiO_2$—$Al_2O_3$, was prepared by impregnating cobalt nitrate into a silica-alumina powder. The silica-alumina was first prepared by co-precipitation of sodium silicate, sodium aluminate, aluminium sulphate and sulphuric acid so as to obtain a final composition with $SiO_2/Al_2O_3=5/95$, and a specific surface area of 220 $m^2/g$ after calcining for 6 hours at 600° C. The suspension obtained was spray dried and the support obtained was in the form of a powder with a grain size in the range 20 to 150 microns.

The catalyst from the impregnation step was dried and calcined at 400° C. for 2 hours. The cobalt metal content was 13% by weight.

EXAMPLE 2 (IN ACCORDANCE WITH THE INVENTION)

Catalyst B

Catalyst B, $Co/SiO_2$—$Al_2O_3$, was prepared by impregnating cobalt nitrate into a silica-alumina prepared by co-precipitation of a mixture of silicic acid $H_2SiO_4$ and aluminium nitrate, to which ammonia had been added. After spray drying, the support obtained was in the form of 40 to 120 micron microspheres.

After calcining at 700° C. for 6 hours, the silica-alumina composition $SiO_2/Al_2O_3$ was 10/95 and the specific surface area was 170 $m^2/g$.

The catalyst from the impregnation step was dried and calcined at 400° C. for 2 hours. The cobalt metal content was 12.5% by weight.

EXAMPLE 3 (IN ACCORDANCE WITH THE INVENTION)

Catalyst C

Catalyst C, $Co/SiO_2$—$Al_2O_3$, was prepared by impregnating cobalt nitrate into a Siralox 5 type silica-alumina (sold by Condea) prepared by adding silicic acid to a hydrolysed aluminium alkoxide. The support obtained was calcined at 100° C. for 12 h, its specific surface area was 150 $m^2/g$ and its $SiO_2$ weight content was 5%. The infrared spectrum of the hydroxyls obtained after pelletisation of the support alone and vacuum treatment at 500° C. showed the presence of a band at 3750 $cm^{-1}$ relative to SiOH to which was added a large peak between 3750 and 3725 $cm^{-1}$ relative to Al—OH, with a lower intensity.

The catalyst from the impregnation step was dried and calcined at 400° C. for 2 hours. The cobalt metal content was 12.5% by weight.

EXAMPLE 4 (IN ACCORDANCE WITH THE INVENTION)

Catalyst D

A catalyst D was prepared in the same manner as catalyst C; lanthanum nitrate was added at the same time as the silicic acid to obtain a catalyst containing 12% by weight of cobalt on a support constituted by 2% by weight of lanthanum oxide, 5% by weight of silica and 93% by weight of alumina. Its specific surface area was 145 $m^2/g$ after calcining for 2 hours at 400° C.

EXAMPLE 5 (COMPARATIVE)

Catalyst E

A catalyst E, $Co/Al_2O_3$, was prepared by impregnating cobalt nitrate into a Puralox Scca 5–170 alumina powder with a specific surface area of 180 $m^2/g$. This support was in the form of microspheres with a grain size in the range 20 to 150 microns.

The catalyst from the impregnation step was dried and calcined at 400° C. for 2 hours.

The final cobalt metal content was 12.5% by weight.

EXAMPLE 6 (COMPARATIVE)

Catalyst F

A catalyst F was prepared using the following steps in succession:
1. Impregnation of TEOS (tetraethoxysilane) into puralox scca 5–170 microspheres with a specific surface area of 180 $m^2/g$, using the method described by B. BEGUIN, E. GARBOWSKI and M. PRIMET in "Journal of Catalysis", page 595, volume 127, 1991;
2. Calcining at 500° C. for 2 hours;
3. Impregnating with cobalt nitrate, drying and calcining at 400° C. for 2 hours.
   The infrared spectrum of the hydroxyls obtained after pelletisation of the modified support alone and vacuum treatment at 500° C. showed only the presence of a hydroxyl band at 3745 $cm^{-1}$ relative to SiOH; the alumina hydroxyl bands at 3760, 3730, 3685 and 3580 $cm^{-1}$ had disappeared.
   Catalyst F contained 13% by weight of cobalt and 3% by weight of silica on a support constituted by alumina.

EXAMPLE 7 (COMPARATIVE)

Catalyst G

Catalyst G, $Co/SiO_2$—$Al_2O_3$, was prepared by impregnating cobalt nitrate into a silica-alumina powder.

The silica-alumina was prepared by adding silicic acid to an alumina gel obtained by hydrolysis of an aluminium alkoxide.

The support obtained was calcined at 500° C. for 4 hours; its specific surface area was 410 m²/g and it comprised 20% by weight of silica and 80% by weight of alumina.

The catalyst obtained after impregnating with the cobalt nitrate was dried then calcined at 400° C. for 2 hours.

The cobalt content of the catalyst was 13% by weight.

EXAMPLE 7 BIS (COMPARATIVE)

Catalyst H

A catalyst H, Co/SiO$_2$—Al$_2$O$_3$, was prepared by impregnating cobalt nitrate into a calibrated silica-alumina powder.

The silica alumina powder was obtained by precipitating hydrargillite in an alkaline medium, washing in the presence of ammonia until intense dealkalinisation then intimate mixing by passage through an IKA colloidal mill in the presence of CO$_2$ with a solution of orthosilicic acid itself obtained by decationisation of a solution of alkaline silicate, to obtain a homogeneous suspension which was then spray dried then calcined at 1100° C. for 6 hours. A silica-alumina was obtained with a specific surface area of 170 m²/g.

The support was then impregnated with cobalt nitrate, dried at 120° C. for 6 hours, and calcined at 400° C. in nitrogen for 3 hours.

Catalyst H contains 12.8% by weight of cobalt and 7% by weight of silica on a support constituted by silica-alumina.

EXAMPLE 7 TER

Comparative Dissolution Tests 10.2 grams of alumina Al$_2$O$_3$ in the form of the hydrate Al(OH)$_3$ with a hydrargillite structure prepared in accordance with Example 7 bis was brought into contact for 2 hours at 80° C. then 110° C. with 60 milliliters of an aqueous solution of sulphuric acid containing 80 grams of pure acid. At the end of 2 hours, the hydrated alumina had completely dissolved and formed a clear solution of aluminium sulphate.

Separately, 10.2 grams of alumina Al$_2$O$_3$ in the form of Puralox SCCA-5-170 used in comparative example 6 was brought into contact for 2 hours at 80° C. then 110° C. with 60 milliliters of an aqueous sulphuric acid solution containing 80 grams of pure acid. At the end of 2 hours, the supernatant liquid was filtered. The total quantity of aluminium in the filtrate expressed, in terms of the alumina, was less than 0.5 grams.

It then appears that under operating conditions in which the activated alumina used in comparative example 6 was partially soluble, the alumina hydrates or gels as cited in the present invention were completely soluble.

EXAMPLE 8

Catalytic Tests in a Fixed Bed Reactor

Catalysts A to F, the preparations of which were described in Examples 1 to 6, were tested in a gas phase fixed bed in a unit functioning continuously and operating with 20 cm³ of catalyst. The catalysts were initially reduced in situ at 350° C. for 12 hours in a mixture of hydrogen and nitrogen containing 30% hydrogen, then for 12 hours in pure hydrogen.

The catalyst test conditions were as follows:

T, ° C.=220° C.;

Pressure=2 MPa;

hourly space velocity (HSV)=1500 h$^{-1}$;

H$_2$/CO mole ratio=2/1

TABLE 1

Conversion of synthesis gas into hydrocarbons

| Catalyst | CO conv (% vol after 100 h) | Distribution of products formed (weight %) | |
|---|---|---|---|
| | | C1 | C5+ |
| A (invention) | 65 | 12 | 77 |
| B (invention) | 65 | 13 | 75 |
| C (invention) | 62 | 10 | 76 |
| D (invention) | 62 | 9 | 79 |
| E (comparative) | 68 | 16 | 54 |
| F (comparative) | 68 | 21 | 64.5 |

The results of Table 1 show that the selectivity of the process of the invention, in the presence of catalyst A, B or C supported on an amorphous silica-alumina, is improved for heavy products for a substantially equivalent conversion.

EXAMPLE 9

Catalytic Tests in a Three-Phase Reactor

Catalysts A to G described in Examples 1 to 8 above were tested in a perfectly stirred three-phase reactor functioning continuously and operating with a concentration of 10% (molar) of catalyst in suspension.

The catalyst test conditions were as follows:

T, ° C.=230° C.;

Pressure=2 MPa;

hourly space velocity (HSV)=1000 h$^{-1}$;

H$_2$/CO mole ratio=2/1

TABLE 2

Conversion of synthesis gas into hydrocarbons

| Catalyst | CO conv (% vol after 100 h) | Distribution of products formed (weight %) | |
|---|---|---|---|
| | | C1 | C5+ |
| A (invention) | 55 | 9 | 78 |
| B (invention) | 55 | 10 | 77 |
| C (invention) | 53 | 9 | 77 |
| D (invention) | 53 | 8 | 77 |
| E (comparative) | 50 | 11 | 64 |
| F (comparative) | 49 | 12 | 66 |
| G (comparative) | 50 | 15 | 63 |

The results of Table 2 show that the catalysts of the invention (A to D) have improved conversion and selectivity for heavy products with respect to comparative catalysts E, F and G.

After 500 hours of test, the mechanical strength of catalysts A to F were evaluated by measuring the grain size of the catalysts obtained after separating the reaction products. Table 3 below shows the % of catalyst particles with a size of less than 20 microns formed when testing catalysts A to G.

TABLE 3

| Catalyst | Attrition resistance<br>% of particles less than 20 microns |
|---|---|
| A (invention) | 5 |
| B (invention) | 3 |
| C (invention) | 4 |
| D (invention) | 4 |
| E (comparative) | 10 |
| F (comparative) | 9 |
| G (comparative) | 9 |
| H (invention) | 3.5 |

The mechanical strength of the catalysts used in the process of the invention (A to D and H) was substantially higher compared with catalysts E, F and G.

EXAMPLE 10

Catalysts A and E described in Examples 1 and 5 above were used in an apparatus comprising (see FIG. 1):
- a slurry bubble column with an internal diameter of 50 mm and a height of 1500 mm;
- a synthesis gas inlet pipe at the base of the column;
- a suspension withdrawal pipe above the liquid level;
- a suspension re-injection pipe at the base of the column;
- a circulation loop comprising a degasser, a settler and a pump.

Catalyst A, introduced into the column in an amount of 500 g in 1.5 l of n-C18 paraffin, was used under the following conditions:

Feed flow rate: 1 m³/h of a CO:H$_2$ mixture (mole ratio 1:2);
T=220° C.;
P=2 MPa.

The CO conversion was 72%; the C5+ selectivity was 77% by weight. The catalyst was separated from the products using a settler; the catalyst content in the liquid was less than 250 ppm by weight, i.e., about 33 ppm of cobalt, which required very simple filtration, without the need for recycling the very small quantities of catalyst filtered towards the reactor.

Catalyst E, used under the same conditions as those used for A, produced a CO conversion of 65% and a C5+ selectivity of 76%. Settling in the same apparatus left 0.15% by weight of catalyst in the liquid, i.e., about 180 ppm of cobalt, which necessitated a subsequent more complex filtration and recycling of the separated catalyst to the reactor.

The process of the invention carried out using catalyst A thus led to improved performances and easier separation of the catalyst with respect to catalyst E, with no substantial loss of cobalt.

What is claimed is:

1. In a process for synthesising hydrocarbons from a mixture comprising carbon monoxide and hydrogen in the presence of a catalyst comprising at least one group VIII metal supported on a silica-alumina prepared by co-precipitating and calcining at a temperature in the range from about 500° C. to about 1200° C. for at least 6 hours such that said silica-alumina has a specific surface area of less than 260 m²/g, the impruvement wherein the silica alumina support is prepared by bringing at least tow solutions into contact under controlled operating conditions and co-precipitation, drying with forming then calcining.

2. In a process for synthesising hydrocabons from a mixture comprising carbon monoxide and hydrogen in the presence of a catalyst comprising at least one group VIII metal supported on a silica-alumina prepared by co-precipitating and calcining at a temperature in the range from about 500° C. to about 1200° C. for at least 6 hours such that said-alumina has a specific surface area of less than 260 m²/g, the improvement wherein the silica alumina support is prepared by precipitation of an alumina hydrogel then in which the mixture silica alumina hydrogel is obtained by adding a solution of silicic acid, intense homogenisation by vigorous stirring, shearing, colloidal milling, drying with forming then calcining.

3. In a process for synthesising hydrocarbons from a mixture comprising carbon monoxide and hydrogen in the presence of a catalyst comprising at least one group VIII metal supported on a silica-alumina prepared by co-precipitating and calcining at a temperature in the range from about 500° C. to about 1200° C. for at least 6 hours such that said silica-alumina has a specific surface area of less than 260 m²/g, the improvement comprising conducting the co-precipitating wherein in a first stage, an aqueous solution of silicic acid is prepared by decationisation of water-soluble alkaline silicate, then in which this solution is brought into contact with an aqueous solution containing at least one cationic aluminium salt, and in which the aqueous solution obtained is co-precipitated with ammonia under controlled operating conditions.

4. In a process for synthesising hydrocarbons from a mixture comprising carbon monoxide and hydrogen in the presence of a catalyst comprising at least one group VIII metal supported on a silica-alumina prepared by co-precipitating and calcining at a temperature in the range from about 500° C. to about 1200° C. for at least 6 hours such that said silica-alumina has a specific surface area of less than 260 m²/g, the improvement comprising conducting the co-prrecipitating wherein in a first stage, an aqueous solution of silicic acid is prepared by decationisation of a water-soluble alkaline silicate, then in which this solution is simultaneously brought into contact with an non aqueous solution of at least one aluminium alkoxide and with water, under controlled operating conditions, to hydrolyse said alkoxide by incorporating the silica simultaneously therein, then in which the aqueous suspension obtained is homogenised by intense agitation, then dried and formed by spray drying.

5. In a process for synthesising hydrocarbons from a mixture comprising carbon monoxide and hydrogen in the presence of a catalyst comprising at least one group VIII metal supported on a silica-alumina prepared by co-precipitating and calcining at a temperature in the range from about 500° C. to about 1200° C. for at least 6 hours such that said silica-alumina has a specific surface area of less than 260 m²/g, the improvement comprising conducting the co-precipitating wherein in a first stage, an aqueous solution of silicic acid is prepared by decationisation of a water-soluble alkaline silicate, then in which this solution is brought into contact with the hydrolysis product of at least one aluminium alkoxide, and in which the aqueous suspension obtained is homogenised by intense agitation, then dried and formed by spray drying.

6. A process according to claim 2, in which homogenisation is carried out by ultramilling in a colloidal mill.

7. A process according to claim 1, in which the silica-alumina is calcined at a temperature in the range 700° C. to 1200° C. for at least 10 hours.

8. A process according to claim 1, in which the silica-alumina is initially calcined at a temperature in the range 350° C. to 550° C. for at least 1 hour, then at a temperature in the range of about 500° C. to about 1200° C. for at least 6 hours.

9. A process according to claim 1, in which the silica-alumina is homogeneous on a micrometer scale.

10. A process according to claim 1, in which the silica-alumina is homogeneous on a nanometer scale.

11. A process according to claim 1, in which the amount of anionic and cationic impurities is less than 0.1% by weight.

12. A process according to claim 1, in which the silica-alumina contains 0.5% to 30% by weight of silica with respect to the anhydrous product.

13. A process according to claim 1, in which the group VIII metal content is in the range 0.1% to 50% by weight.

14. A process according to claim 1, in which the group VIII metal is cobalt.

15. A process according to claim 1, in which the catalyst contains at least one additional element selected from the group formed by: ruthenium, molybdenum, tantalum, platinum and palladium.

16. A process according to claim 1, in which the catalyst further contains 0.1% to 5% by weight of at least one oxide $M_2O_3$ of at least one metal M selected from the group formed by lanthanum, praseodymium and neodymium.

17. A process according to claim 1, in which the catalyst is used in suspension in a liquid phase, in a three-phase reactor.

18. A process according to claim 17, in which said catalyst is in the form of a powder with a grain size of less than 800 microns.

19. A process according to claim 1, in which the catalyst is used in a fixed bed in the form of particles with an equivalent diameter in the range 2 to 10 mm.

* * * * *

UNITED STATES PATENT AND TRADEMARK OFFICE
CERTIFICATE OF CORRECTION

PATENT NO. : 6,977,273 B2 Page 1 of 1
DATED : December 20, 2005
INVENTOR(S) : Magalie Roy-Auberger et al.

It is certified that error appears in the above-identified patent and that said Letters Patent is hereby corrected as shown below:

Column 13,
Line 64, "impruvement" should read -- improvement --.
Line 65, "tow" should read -- two --.

Column 14,
Line 1, "hydrocabons" should read -- hydrocarbons --.
Line 7, "said-alumina" should read -- said silica-alumina --.
Line 10, "mixture" should read -- mixed --.
Line 38, "co-prre-" should read -- co-pre- --.
Line 43, "an non" should read -- a non --.

Signed and Sealed this

Second Day of May, 2006

JON W. DUDAS
*Director of the United States Patent and Trademark Office*